Patented July 21, 1942

2,290,603

UNITED STATES PATENT OFFICE 2,290,603

RECOVERY OF PHENOLS AND OLEFINS

Donald R. Stevens, Swissvale, and Joseph B. McKinley, Pittsburgh, Pa., assignors to Gulf Research & Development Company, Pittsburgh, Pa., a corporation of Delaware No Drawing. Application December 27, 1939, Serial No. 311,212

6 Claims. (Cl. 260—621)

This invention relates to the recovery of phenols and olefins; and it comprises a method of recovering phenols and olefins from alkylated phenols carrying three or more carbon atoms in at least one side chain wherein said alkylated phenols are dealkylated by heating in the presence of an aromatic sulfonic acid thereby splitting off the alkyl side chain from the phenolic nucleus with formation of mono-olefins with little or no polymerization; all as more fully hereinafter set forth and as claimed.

Various alkylated phenols are technically available from which it is desirable to produce simpler phenols and an olefin group without any fargoing polymerization or molecular change in the olefin produced. In particular, such alkylated phenols are an intermediate product in methods of separating isomeric phenols, such as cresols, with not much difference in boiling point. By alkylating one or both phenols, reaction mixtures are produced with which separation by fractional distillation becomes ready. Afterwards it is generally desirable to dealkylate and recover the original phenol or phenols.

Under the present invention from such alkylated starting materials, it is possible to produce substantially pure phenols and olefins, particularly branched chain olefins, such as iso-butylene and iso-amylene. Good yields are obtained both of the phenol and of the olefin.

For the present purposes it is desirable to use a catalyst which while aiding in the splitting off of the side chain, does not catalyze or promote the formation of undesirable polymers and oxidation products. Necessarily the catalyst must be stable and should not react with the products of dealkylation to form undesirable compounds. Such a catalyst is afforded by an aromatic sulfonic acid.

Dealkylation of alkylated phenols by heating in the presence of such dealkylating catalysts as sulfuric acid is objectionable in that this material has a considerable tendency to polymerize the olefins formed and cause objectionable side reactions and particularly if the conditions of temperature and pressure are not maintained at relatively low levels. At low temperatures and pressures the reaction is slow and the yields are not good.

We have found that the aromatic sulfonic acids are effective dealkylating catalysts and do not have the stated disadvantages. These acids are comparatively stable compounds and exhibit much less tendency to cause side reactions, including formation of polymers or oxidation products. When they are used as catalysts, dealkylation can be carried out rapidly and completely and high yields of pure products are obtained.

Thus by subjecting alkylated phenols containing branched-chain alkyl substituents having at least three carbon atoms to the action of aromatic sulfonic acids at temperatures from 80° to 300° C., we have been able to effect dealkylation of the alkylated phenols with the production of substantially pure iso-olefin in good yield; there is little polymerization of the iso-olefin. We have obtained particularly good results by this method in producing olefins containing from 3 to 6 carbon atoms.

The aromatic sulfonic acids are advantageously used in amounts equivalent in moles of sulfuric acid to 0.1 to 1.0 per cent by weight, based on the weight of alkylated phenol, of 95 per cent sulfuric acid. However, because of their high efficiency satisfactory results may be obtained with amounts as low as the equivalent of 0.05 per cent sulfuric acid, and they can be used in higher concentration, the equivalent of 2.0 per cent or more of sulfuric acid when very rapid dealkylation is desired.

In order to effect satisfactory dealkylation with these dealkylating catalysts an elevated temperature is best. While some dealkylation is effected at temperatures as low as 80° C., temperatures of at least about 150° C. are usually required to carry out the reaction in a reasonable length of time. Temperatures which approach the boiling point of the dealkylated phenol are particularly advantageous in batch operation, and in continuous operation even higher temperatures may be used advantageously. In general, however, excessively high temperature above about 300° C. should be avoided. Too low temperatures are also undesirable because we have found that a decrease in temperature causes a decrease in the speed and extent of the dealkylating action.

It is usually advantageous to conduct the dealkylation at atmospheric pressure, although superatmospheric pressures and sub-atmospheric pressures may be used in some instances. Working at atmospheric pressure is of especial advantage where continuous operation is attempted. However, working under some pressure is also advantageous in that the size of the equipment may be reduced and refrigeration is not required to liquefy and separate the evolved iso-olefin. For example, forty-five pounds pressure will liquefy iso-butylene at room temperature. Too high pressures are to be avoided as they may cause reversal of the reaction. When it is desired to flash off the phenol formed during the reaction reduced pressure may be used but recovery of the iso-butylene product then becomes more difficult.

The dealkylation operation can advantageously be conducted by heating the alkylated phenol under a reflux in the presence of a small amount of the dealkylating catalyst. Evolution of the olefin usually begins at about 80° to 100° C. and increases as the temperature rises. Heating is usually continued until the evolution of olefin ceases or until the boiling point of the residue indicates that dealkylation has proceeded to the desired point. Ordinarily, this will be the point of complete or substantially complete dealkylation of the alkylated phenol, but in special instances partial dealkylation may be effected. To illustrate: a di-butylated cresol may be reduced to a mono-butylated cresol whenever it is desired to obtain the latter product.

It will be understood that in using the term "dealkylation" we are referring to a splitting off of relatively high alkyl groups; alkyl substituents containing three or more carbon atoms, such as isopropyl and tertiary butyl groups. Dealkylation in the contemplated manner does not split off such methyl or ethyl groups as are present. Thus it will not reduce a cresol to phenol ($C_6H_5OH$). Furthermore, by the term "dealkylation catalysts", as used herein we mean aromatic sulfonic acids such as benzene sulfonic acid, alpha-naphthalene sulfonic acid, beta-naphthalene sulfonic acid, phenol sulfonic acid, cresol sulfonic acid, alpha-naphthol sulfonic acid, beta-naphthol sulfonic acid and the like; these compounds, when used according to the method of our invention, will cause a splitting off of the relatively high alkyl groups, but will not decompose cresols, xylenols or ethyl phenols.

Phenol sulfonic acids are particularly good dealkylating catalysts. They may be advantageously used in amounts equivalent to about 0.3 to 0.6 per cent of sulfuric acid. However, because of their high efficiency satisfactory results may be obtained with amounts as low as the equivalent of 0.05 per cent sulfuric acid, and they can be used in higher concentrations, for example, the equivalent of 2.0 per cent or more of sulfuric acid. Dealkylation is most readily effected in the presence of phenol sulfonic acids at temperatures ranging from 150° to 250° C. Temperatures as low as 80° C. may be used, but in such instances a longer period of time is required to carry out the reaction. The chief advantage in the use of the phenol sulfonic acids as catalysts is that the rate of iso-olefin evolution is greatly increased over that obtained with an equivalent amount of sulfuric acid. This is probably due to the fact that the phenol sulfonic acids are more readily soluble in the alkylated phenols, than is sulfuric acid itself.

In the following examples the effectiveness of various aromatic sulfonic acids in liberating iso-olefins from alkylated phenols is specifically illustrated.

*Example I.*—9.821 g. of 2,6-di-tertiary-butyl-4-methyl phenol, just sufficient to give off 2000 cc. of iso-butylene gas at standard temperature and pressure on complete debutylation was placed in a reaction vessel. The vessel was surrounded by a nitro-benzene vapor bath, which maintained the temperature at about 208° C. or just above the refluxing temperature of para-cresol, the phenolic end product of the dealkylation. When the 2,6-di-tertiary-butyl-4-methyl phenol had been brought to temperature a small vial containing phenol sulfonic acid in amount equivalent to 0.5 per cent of 95 per cent sulfuric acid was introduced into the reaction chamber, the entrance port was closed immediately and a timer was started. The iso-butylene evolved was collected in a large bottle immersed in a water bath, thermostatically controlled and held at 27° C. The bottle had been filled with water at the start of the run and with the aid of a manometer, the water was siphoned out of the bottle at the same rate at which the iso-butylene was collected. The water was withdrawn into a measuring cylinder and the gas was collected at atmospheric pressure. At the end of 1800 seconds 100 per cent of the theoretical yield of iso-butylene had been collected.

*Example II.*—The same procedure as in Example I was followed with the exception that the catalyst used was benzene sulfonic acid. At the end of 1800 seconds 98.1 per cent of iso-butylene had been collected. At the end of 3000 seconds 100 per cent of iso-butylene had been collected.

*Example III.*—The same procedure as in Example I was followed with the exception that the catalyst used was beta-naphthalene-sulfonic acid. At the end of 1800 seconds 98.0 per cent of the theoretical yield of iso-butylene had been collected. At the end of 3000 seconds 100 per cent of iso-butylene was collected.

From the following table, showing the activities of the various catalysts, it is apparent that the phenol sulphonic acids exhibit properties which make their use as dealkylation catalysts particularly desirable. When a phenol sulfonic acid is employed as a catalyst the rate of iso-olefin evolution is increased, and 100 per cent iso-olefin is obtained at the end of 1800 sec. Use of the other catalysts results in a somewhat slower rate of evolution; and 3000 seconds are required to collect 100 per cent iso-olefin.

TABLE I

*Dealkylation of 2,6-di-tertiary-butyl-4-methyl phenol*

| Catalyst | Per cent H₂SO₄ equivalent | Time (seconds) required to collect the following theoretical percentages of iso-butylene | | | | | Per cent iso-butylene collected | |
|---|---|---|---|---|---|---|---|---|
| | | 10% | 30% | 50% | 70% | 90% | 1,800 sec. | 3,000 sec. |
| Benzene sulfonic acid | 0.5 | 34 | 92 | 187 | 388 | 912 | 98.1 | 100.0 |
| Beta naphthalene sulfonic acid | 0.5 | 32 | 93 | 198 | 408 | 915 | 98.0 | 100.0 |
| Phenol sulfonic acid | 0.5 | 51 | 104 | 180 | 320 | 640 | 100.0 | 100.0 |
| Sulfuric acid | 0.5 | 130 | 200 | 298 | 500 | 920 | 98.5 | 100.0 |

Although the above examples are limited to batch operation, the process may be used continuously. In a continuous process we advantageously operate at temperatures higher than 200° C; we may use temperatures as high as 300° C. and operate in the vapor phase. Thus in dealkylating alkylated cresols we advantageously operate at temperatures ranging from 225–230° C. By using this temperature range we find that the cresol is vaporized and carried away as liberated. This is advantageous for the cresol does not stay behind to dilute the reaction mixture.

The ratio of unreacted alkylated phenol to catalyst remains high, and the rate of gas evolution is materially increased and held more constant during the entire dealkylation period.

The sulfuric acid referred to herein and in the appended claims is the ordinary commercial sulfuric acid of about 95 per cent concentration.

What we claim is:

1. A process of obtaining olefins and phenols from alkylated phenols which comprises heating an alkylated phenol having at least one branched chain alkyl substituent in the presence of a small amount of an aromatic sulfonic acid and collecting the evolved olefin.

2. A process of obtaining olefins and phenols which comprises heating at a temperature of about 80° to about 300° C., an alkylated phenol having at least one branched chain alkyl substituent, in the presence of an aromatic sulfonic acid in amount equivalent to 0.05 per cent to 2.00 per cent of sulfuric acid and collecting the evolved olefin.

3. A process of obtaining olefins and phenols which comprises heating at a temperature of about 80° to about 300° C., an alkylated phenol having at least one branched chain alkyl substituent, in the presence of a phenol sulfonic acid in amount equivalent to 0.05 to 2.00 per cent of sulfuric acid and collecting the evolved olefin.

4. A process of obtaining olefins and phenols which comprises heating at a temperature of about 80° to about 300° C. an alkylated phenol having at least one branched chain alkyl substituent in the presence of a benzene sulfonic acid in amount equivalent to 0.05 to 2.00 per cent of sulfuric acid and collecting the evolved olefin.

5. A process of obtaining olefins and phenols from alkylated phenols which comprises heating at a temperature of about 80° to about 300° C. an alkylated phenol having at least one branched chain alkyl substituent in the presence of a naphthalene sulfonic acid in amount equivalent to 0.05 to 2.00 per cent of sulfuric acid and collecting the evolved olefin.

6. A process of producing olefins and phenols comprising heating at a temperature sufficient to cause dealkylation, an alkylated phenol having at least one branched chain alkyl substituent in the presence of a small amount of an aromatic sulfonic acid under pressure sufficient to liquefy at room temperature the liberated olefin and collecting the liberated olefin.

DONALD R. STEVENS.
JOSEPH B. McKINLEY.